(12) United States Patent
Habert et al.

(10) Patent No.: US 8,494,736 B2
(45) Date of Patent: Jul. 23, 2013

(54) METHOD AND DEVICE FOR VEHICLE DRIVING ASSISTANCE

(75) Inventors: Patrice Habert, Cerny (FR); Eric Vigerie, Voisins le Bretoneux (FR)

(73) Assignee: Renault S.A.S., Boulogne Billancourt (FR)

( * ) Notice: Subject to any disclaimer, the term of this patent is extended or adjusted under 35 U.S.C. 154(b) by 981 days.

(21) Appl. No.: 12/524,372

(22) PCT Filed: Jan. 7, 2008

(86) PCT No.: PCT/FR2008/050017
§ 371 (c)(1),
(2), (4) Date: Sep. 15, 2009

(87) PCT Pub. No.: WO2008/102090
PCT Pub. Date: Aug. 28, 2008

(65) Prior Publication Data
US 2010/0087998 A1   Apr. 8, 2010

(30) Foreign Application Priority Data

Jan. 24, 2007  (FR) ..................................... 07 00474

(51) Int. Cl.
*G06F 19/00* (2011.01)
(52) U.S. Cl.
USPC .............................................. 701/64; 701/55
(58) Field of Classification Search
USPC .............................................. 477/80; 701/55
See application file for complete search history.

(56) References Cited

U.S. PATENT DOCUMENTS

| 4,439,158 | A | | 3/1984 | Weber |
| 4,599,917 | A | | 7/1986 | Léorat et al. |
| 4,677,556 | A | | 6/1987 | Habu |
| 4,853,673 | A | * | 8/1989 | Kido et al. ..................... 340/439 |
| 5,226,351 | A | * | 7/1993 | Matsuoka et al. ............... 477/32 |
| 6,085,137 | A | * | 7/2000 | Aruga et al. ..................... 701/51 |
| 7,003,387 | B2 | * | 2/2006 | Baize et al. ..................... 701/55 |
| 7,684,919 | B2 | * | 3/2010 | AbuSamra ....................... 701/54 |

FOREIGN PATENT DOCUMENTS

| DE | 39 12359 | 10/1990 |
| EP | 0 007 881 B1 | 9/1982 |
| EP | 0 965 777 B1 | 4/2003 |
| EP | 1 041 314 B1 | 7/2003 |
| EP | 1 523 632 B1 | 3/2006 |
| FR | 2 431 737 A1 | 2/1980 |
| FR | 2 545 567 A1 | 11/1984 |

(Continued)

*Primary Examiner* — Marthe Marc-Coleman

(74) *Attorney, Agent, or Firm* — Oblon, Spivak, McClelland, Maier & Neustadt, L.L.P.

(57) ABSTRACT

A method and device for driving assistance for a propulsion unit of a vehicle with manual control of the transmission gear ratio, using a control system with a calculator controlling an indication to a driver of a recommended gear ratio based on a request information from the driver and depending on driving conditions of the vehicle at any moment, and a mapping of the gear change rules from which the ratio to be recommended is determined, depending on the vehicle speed at each moment, for an optimal fuel consumption and a minimized pollutant emission. The recommended ratio for an optimal consumption is corrected in successive steps by taking into account, one after the other, a set of constraints concerning the driving safety and comfort, each step having priority over the previous one so that the ratio finally recommended is an optimal balance between the different constraints while putting an emphasis on driving safety.

10 Claims, 3 Drawing Sheets

FOREIGN PATENT DOCUMENTS

| | | |
|---|---|---|
| FR | 2 779 793 A1 | 12/1999 |
| FR | 2 791 751 A1 | 10/2000 |
| FR | 2 822 972 A1 | 10/2002 |
| FR | 2 842 579 A1 | 1/2004 |
| FR | 2 863 092 | 6/2005 |
| FR | 2 863 331 A1 | 6/2005 |
| WO | WO 02/078996 A1 | 10/2002 |

* cited by examiner

METHOD AND DEVICE FOR VEHICLE DRIVING ASSISTANCE

BACKGROUND OF THE INVENTION

The subject of the invention is a method and a device to assist with the control of the propulsion unit of a vehicle that has a manual gearbox or a semi-automatic gearbox that can be operated manually.

A motor vehicle is driven by a propulsion unit comprising a drive engine, a clutch and a gearbox allowing the transmission ratio between the output shaft of the engine and the driven wheels to be modified according to the speed of the vehicle and the torque demanded of the engine.

The gearbox may be controlled manually by the driver or alternatively may be controlled automatically, the gear changes being decided by giving due consideration to various criteria and, at least, to the speed of the vehicle and to the load on the engine at the instant in question.

SUMMARY OF THE INVENTION

In the case of an automatic gearbox, these criteria are manifested in the form of gear-change laws which may be visualized in the way depicted in FIG. 1, on a diagram indicating, on the abscissa axis, the speed of the vehicle and, on the ordinate axis, information representative at each instant of the wishes of the driver which may be manifested in the position of the accelerator pedal or the angular opening of an air intake butterfly valve or, alternatively, in the case of a diesel engine, in the delivery of injected fuel.

As FIG. 1 shows, these laws are defined in such a way that the gear changes are performed at vehicle speeds that are higher, the higher the load on the engine. In addition, the upshift curves, indicated in solid line in FIG. 1, are offset from the downshift curves so that the gear change from a lower gear ratio to a higher gear ratio, for example from third to fourth, occurs, for the same engine load, that is to say for the same position of the accelerator pedal, at an appreciably higher speed than the speed that dictates the shift in the opposite direction, changing down from fourth to third. This then avoids a phenomenon known as "hunting", that is to say instability of the gear ratio near the gear-change curves, which would occur if the upshifts and downshifts occurred under exactly the same speed and load conditions.

FIG. 1 is a relatively simple example, but, in reality, the gear-change laws need to be adapted to suit the various driving situations and it is necessary to give due consideration to other factors, such as the temperature of the engine and of the transmission, the profile of the route which, for example, may rule against upshifting under cornering and, simply, the rate at which the accelerator pedal lifts or is depressed, this being controlled directly by the driver and perhaps corresponding to a simple reflex or an untimely maneuver that does not justify a gear change at the instant in question, given the driving situation.

In addition, modern vehicles have other systems acting on the control of power of the engine, such as traction control systems or course control (stability) systems or speed limiters, the information regarding the demand for power then coming from a regulator.

In the case of automatic or semi-automatic gearboxes, the gear change has to take account of numerous factors and items of information regarding the driving situation. The gear ratio to be engaged is therefore determined by a computer comprising various calculation units which combine the information received in such a way as to command the gear change carefully and at the appropriate moment, particularly in order to ensure driving safety by always maintaining a reserve of power needed to cope with an unforeseen situation.

Automatic transmissions have long been the subject of very in-depth studies and numerous patent applications have been filed to cover various improvements such as, for example, FR-A-2 545 567 which, in particular, relates to the inhibiting of untimely upshifts, FR-A-2 863 331 the subject of which is anticipation of the gear change making it possible, in particular, to avoid a downshift being performed too late, for example when a more rapid regain of speed would have been desirable, or FR-A-2 864 193 the aim of which is to detect a driving situation such as ascent, cornering, descent, and to deduce, from the driver's intentions manifested through his action on the accelerator pedal, either a locking of the current gear ratio or a suitable gear change.

However, the gear-change laws are now designed to minimize fuel consumption and have also to give due consideration to constraints regarding pollutant emissions.

Automatic gearbox control systems are therefore becoming increasingly complex because they have simultaneously to give due consideration to numerous factors which interact with one another.

By contrast, in a vehicle with a manual, mechanical or semi-automatic gearbox, it is the driver who chooses when he has to change gear, in the form of an upshift or downshift, according to the speed of the vehicle, the engine speed and the profile of the route, be it ascending, descending or, for example, approaching a bend.

To do that, the driver visually assesses the profile of the route for himself and gives due consideration to the vehicle speed indicated on the dashboard and, possibly, to a rev counter indicating the engine speed.

By contrast, it is more difficult for the driver to assess for himself what gear ratio he needs to engage in order to reduce his fuel consumption and pollutant emissions.

Because the fuel economy criterion is important for heavy goods vehicles, driving aid systems that indicate the recommended gear ratio to the driver have, for a few years now, already been proposed.

Document FR-A-2 431 737, for example, describes a device of this type comprising a computer that gives due consideration to instantaneous values of the engine speed, the vehicle speed and the load, all measured by sensors, in order visually or audibly to display information relating to fuel consumption and, if appropriate, the need to upshift or downshift.

In particular, an illuminated table which indicates various curves of equal fuel consumption embodies the torque/speed diagram in such a way as to allow the driver to check, at each instant, whether he is driving in an optimum consumption range.

This information is supplied by a computer as a function of the torque demanded of the engine by the driver which may, for example, be expressed through the position of the accelerator pedal.

Increasing awareness of ecological requirements and changes in the regulations have, however, led to a generalization of such driving aid systems to all vehicles so that all drivers can be given the means of reducing their fuel consumption.

This can be done, with vehicles with an automatic gearbox, by introducing new constraints into the control computers, but it is becoming necessary also to fit, in vehicles with a manual gearbox, a system that lets the driver know, for example through a visible or audible display, which gear ratio is recommended for reducing his fuel consumption and pollutant emissions.

Document U.S. Pat. No. 4,439,158, for example, describes a system of this kind for a vehicle with a manual gearbox and clutch, in which the indications to change gear are calculated on the basis of the engine speed, the reduction ratio of the transmission and the load on the engine, together with other factors such as the engine temperature, the vehicle speed and the payload.

Document FR-A-2 863 092 also describes a system for displaying a recommended gear ratio comprising an element for calculating the value of this gear ratio on the basis of a gear-change law map, as a function of the vehicle speed and of a variable representative of the load applied to the engine and expressed, for example, in terms of the position of the accelerator pedal. The value thus determined for the recommended gear ratio is then corrected by a correction unit which receives at input various items of information relating to the slope of the route, to the speed of the vehicle, to the instantaneous acceleration and the acceleration that the vehicle would have in the higher gear ratio, the rotational speed of the engine, the driving style selected, the position of the accelerator pedal and the rate at which it is being depressed, the state of activation of the braking, etc.

A system such as this that gives due consideration to numerous items of information the effects of which combine with one another is highly complex and therefore requires extensive and expensive computation means.

However, it would seem necessary, in order to comply with increasingly tight regulations, for vehicles of all kinds to be fitted with such driving aid systems. It is therefore an object of the invention to solve this problem by virtue of a new method for assisting with driving that can be implemented using means that are simple, inexpensive and of limited bulk.

In the known way, the vehicle is equipped with a control system with a computer into which there is incorporated a map of gear-change laws on the basis of which there is determined, as a function of the speed of the vehicle at each instant, the gear ratio to be recommended for optimum fuel consumption and minimum pollutant emissions.

According to the invention, the recommended gear ratio is corrected in successive steps giving due consideration, one after the other, to a set of constraints relating to safety and drivability, each step taking priority over the preceding one, so that the gear ratio finally recommended is an optimum compromise between these various constraints, favoring driving safety.

In a particularly advantageous manner, the computer comprises a plurality of separate calculation modules assigned to each of the constraints to be taken into consideration, and, in each correction step the corresponding module checks the relevance of the value of the gear ratio recommended in the preceding step to the constraint with which said module is concerned, and, depending on the result of the check, determines either to move directly on to the next step, maintaining the gear ratio recommended in the preceding step, or to modify this recommended gear ratio either upward or downward.

In the usual scenario in which the information concerning the wishes of the driver is represented by the degree to which the accelerator pedal is depressed, the rate at which the pedal is depressed is measured and too slow depressing, below a given rate, inhibits any demand to downshift without preventing an upshift in the event that the speed of the vehicle increases.

Likewise, demands to upshift are suspended if the pedal lifts rapidly at a rate higher than a given threshold.

The invention also covers a device for implementing the method, characterized in that the computer comprises, on the one hand, an element for determining the recommended gear ratio for optimum fuel consumption, as a function of information concerning the wishes of the driver and with due consideration given to the speed of the vehicle and, on the other hand, a plurality of separate calculation modules independent of one another and each assigned to a determined driving constraint, said modules being arranged in series so that if need be each can apply to the value of the recommended gear ratio a correction suited to the constraint considered and in an order that favors driving quality, each correction applied, as appropriate, by a module, taking priority over the correction applied by the preceding module.

In a preferred embodiment, the computer comprises a unit for selecting a gear-change law as a function of information representative, at each instant, of the profile of the route and of the condition of the propulsion unit and a law management unit determining a recommended gear ratio as a function of the selected law and of information concerning the wishes of the driver, with due consideration, at each instant, to the speed and, as appropriate, to the action applied to the brakes.

In a particularly advantageous manner, the independent correction modules, arranged in series and each assigned to a driving constraint, each comprise an input for a signal corresponding to the value of the gear ratio recommended in the preceding step, an input for one or more signals representative of the parameters to be considered when activating the module if appropriate, a direct output for forwarding to the next step, without activation of the module, the value of the gear ratio recommended in the preceding step, and an output for forwarding to the next step, following activation of the module, the gear ratio that has been corrected as a function of the constraint considered.

According to another preferred feature, the series of correction modules comprises, in succession, starting from the determining of the gear ratio of optimum fuel consumption, at least:

an anti-hunting module in order at each instant to maintain a sufficient reserve of power,
a fixing module for maintaining the gear ratio engaged for as long as safety conditions are not met and in the event that it is detected that the vehicle has started to corner,
an anticipation and anti-linking module to suspend a gear-change demand that comes too soon after the preceding one, and to time out the demands if the driver makes a gear change which is contrary to the recommendation.

Advantageously, the element for determining the recommended gear ratio for optimum fuel consumption is immediately followed by an inhibition module which is activated by a measurement of the rate at which the accelerator pedal is depressed and which, if it is depressed slowly below a given rate, maintains the value of the gear ratio engaged which is then subjected to any successive corrections that might be needed in order finally to determine the recommended gear ratio to be indicated to the driver.

BRIEF DESCRIPTION OF THE DRAWINGS

Other advantageous features of the invention will become apparent from the following description of one particular embodiment which is described by way of example with reference to the attached drawings.

DETAILED DESCRIPTION OF THE INVENTION

Figure 1:
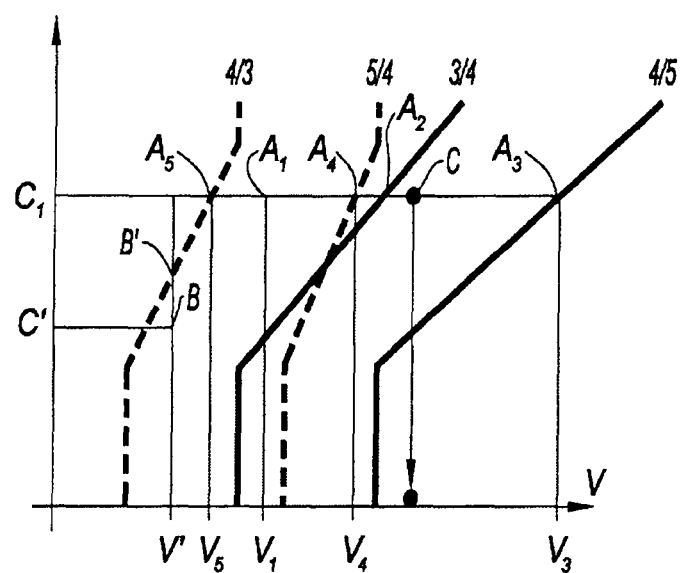
FIG. 1 is a torque/speed diagram indicating one example of gear-change laws for upshifts and downshifts.

The torque/speed diagram of FIG. 1 is one example of a gear-change law map indicating, as a function of the vehicle speed, when the driver should change up, if accelerating, or alternatively change down, to downshift, for example when ascending a hill or braking before entering a bend.

For example, onward of a point A1 for which third gear is engaged and which corresponds to a vehicle speed V1, depressing C1 the accelerator pedal commands a gradual increase in speed of the vehicle with, for the same pedal position, a change to fourth at the point A2 at the speed V2 then a change up to fifth at the point A3, at the speed V3.

If the vehicle slows, for example in an incline, with no action on the accelerator pedal, it is necessary to change back down from fifth to fourth at the point A4, at the speed V4, and then from fourth to third at the point A5, at the speed V5.

Likewise, onward of a point B corresponding to a vehicle speed V' and to a position C' of the accelerator pedal, in order to maintain this speed V', for example in an incline, by increasing the demanded torque, it is necessary to depress the accelerator pedal and to downshift from fourth to third at the point B'.

In the diagram, curves in solid line correspond respectively to the change from third to fourth and from fourth to fifth and the curves in dashed line correspond respectively to the change from fifth to fourth and from fourth to third.

Figure 2:
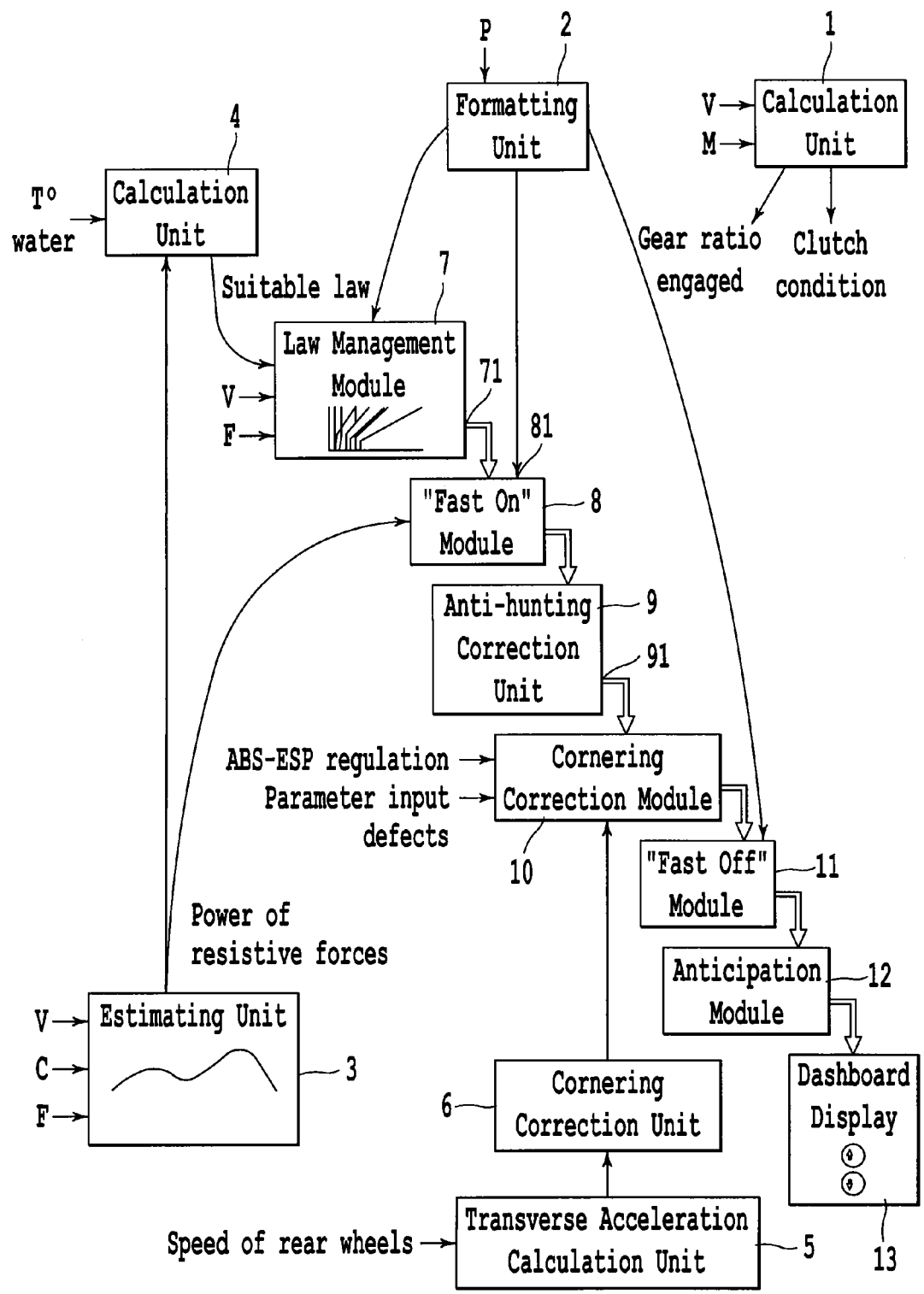
FIG. 2 is an overall diagram showing the overall design of the system according to the invention for displaying a recommended gear ratio.

The overall design of the system for displaying the recommended gear ratio is depicted in FIG. 2.

The system uses a certain number of items of information already present in the engine control system and which are measured by sensors, such as the vehicle speed V, the engine speed M, and information concerning the wishes of the driver expressing a target power datum value and formulated, for example, on the basis of the position P of the accelerator pedal, of the vehicle speed, of the temperature T of the engine cooling water.

The computer comprises several units for estimating certain subfunctions through calculation.

Thus, a calculation unit 1 determines the condition of the drivetrain from the vehicle speed/engine speed ratio and produces at output signals representative of the current gear ratio engaged and of whether the clutch is in the open or closed condition, this information being displayed on the various calculation modules.

A unit 3, on which are displayed signals representative of the vehicle speed V, of the estimated engine torque C and of the state of activation of the brakes F, calculates the power of all of the resistive forces and estimates the differential torque that needs to be supplied as a function of the slope of the route, the load on the vehicle and, possibly, wind.

To do that, the unit 3 may use the equations of dynamics in the way described, for example, in document FR-A-2 822 972.

What happens is that each of the separate modules used, according to the invention, to calculate the various parameters needed for the successive corrections made to the recommended gear ratio may use calculation elements developed beforehand in order, in an automatic gearbox, to give due consideration to the various constraints.

For example, the recommended gear ratio may be suited to a descent situation in a way similar to the strategy described in document FR-A-2 791 751.

The calculation unit 4 selects the suitable gear-change law at each instant as a function of the profile of the route and of the engine conditions.

From the selected law, a law management module 7 determines at each instant the suitable transmission ratio, as a function of the vehicle speed, of the state of activation of the brakes, and of information concerning the wishes of the driver and represented, for example, by the position P of the accelerator pedal. Advantageously, this information may be expressed by a signal supplied by a formatting unit 2 making it possible to avoid recommending an undesirable gear ratio, for example, if the driver lifts his foot rapidly in response to an unforeseen situation.

As indicated above, the map of gear-change laws incorporated into the management module 7 is essentially designed to ensure optimum fuel consumption and minimum pollutant emissions.

The management module 7 therefore, at its output 71, emits a signal representative of this optimum fuel consumption gear ratio which will then be subjected to a succession of correction modules arranged in series and respectively assigned to the essential constraints to be taken into consideration in order to ensure driving safety.

First of all, this optimum fuel consumption gear ratio is displayed at the input to an inhibition module 8 known as a "fast on" module activated by a measurement 81 of the rate at which the accelerator pedal is being depressed, this rate being represented by a signal supplied by the unit 2 that formats the information concerning the driver's wishes and which, in the event that the pedal is being depressed slowly, below a given rate, maintains the value of the gear ratio engaged, consequently inhibiting an inappropriate downshift demand.

Figure 3:
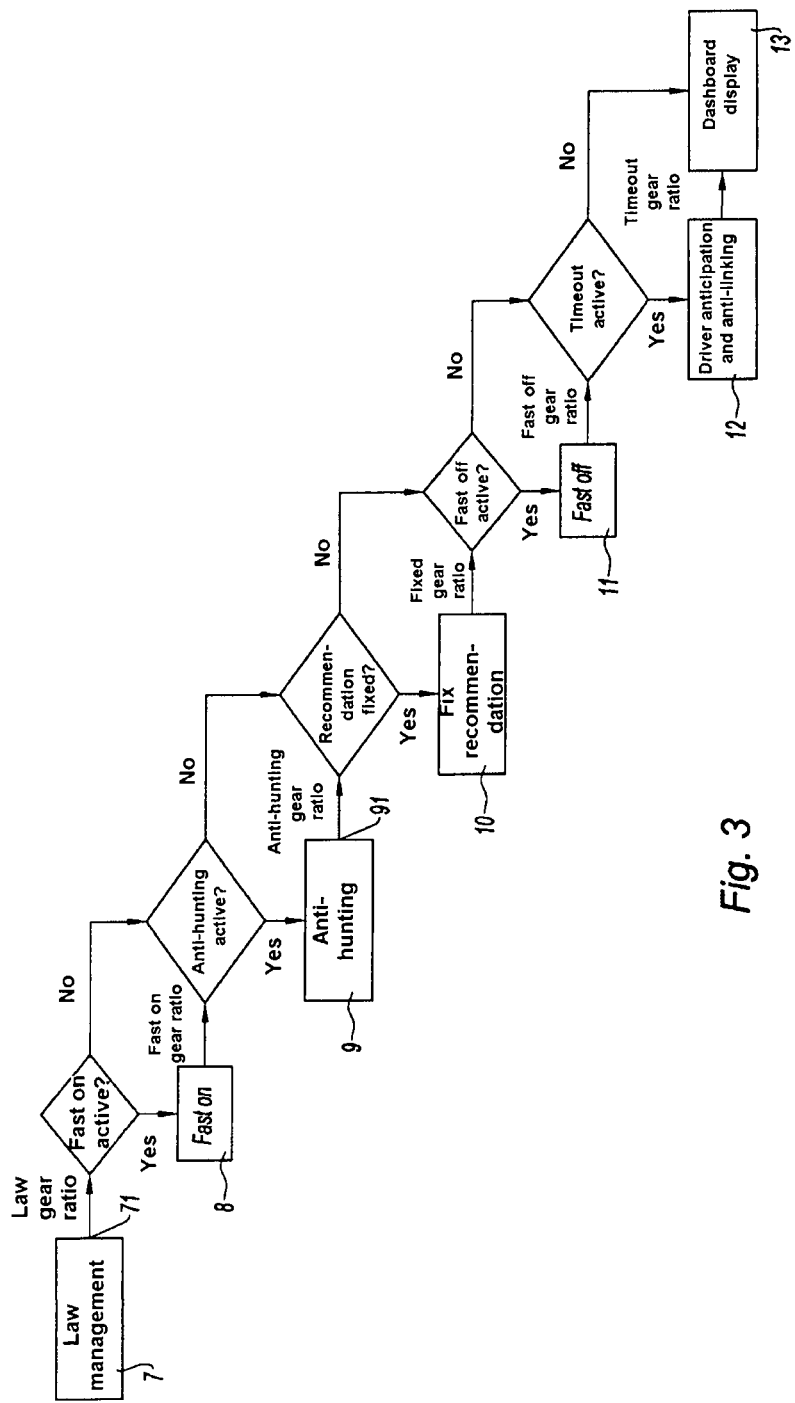
FIG. 3 is a flow diagram showing how the successive steps of the method are linked together.

As indicated by the flow diagram of FIG. 3, the first, anti-hunting correction module 9 therefore receives either the gear ratio recommended by the management module 7 when the "fast on" module 8 is not activated, or the value of the gear ratio engaged in the event that the pedal is being depressed too slowly and checks the relevance of the display of one or other of these two gear ratios to the differential-torque estimate supplied by the estimating unit 3 in order to avoid an unstable state known as hunting, particularly under ascending situations. To do that, it is possible to use the equations indicated in document FR-A-2 842 579 or a gear-change strategy of the kind described in document FR-A-2 545 567.

In the event that there is a risk of hunting, the recommended gear ratio is then corrected and the corresponding signal emitted at the output 91 from the module 9, or alternatively the signal corresponding to the optimum fuel consumption gear ratio, is forwarded directly when the anti-hunting module 9 is not active to be displayed at the input of the next correction module 10 intended to ensure driving safety in the event that it is detected that the vehicle has entered a bend.

Strategies for adapting the transmission ratio to suit a cornering situation are already known for automatic gearboxes.

For example, document FR-A-2 779 793 describes a method in which, on the basis of measurements of the transverse acceleration of the vehicle, of the rotational speed of the engine, of the vehicle speed and of the engine torque, it can be determined whether the vehicle is under cornering and, if it is, a choice is made to maintain the gear ratio engaged or to downshift to the gear below depending on the detection of the resistive forces applied to the vehicle.

Likewise, a cornering situation may be detected by a calculation unit 6 by giving due consideration to the transverse acceleration determined by a calculation unit 5 on the basis of the speeds of the rear wheels and with due consideration to other information provided by the unit 1 concerned with the drive train.

This information is applied to the input to the cornering correction module 10 which checks whether the recommended gear ratio, corresponding to the signal emitted at the output 91 from the anti-hunting module 9, is compatible with the cornering situation thus detected. Thus, any unsafe demand to change gear can be inhibited, the recommendation then being fixed.

Other information relating to an unsafe gear change, for example during ABS or ESP regulation, is also displayed on the correction module 10 so as to fix the recommendation if need be, by keeping the gear ratio engaged at this instant.

Likewise, the module 10 can fix the recommendation in the event of a defect or manifest error in certain parameters needed for the various calculations.

The gear ratio recommended by the anti-hunting module 9 or the gear ratio engaged, in the event that the recommendation has been fixed, is displayed on a module 11 known as the "fast off" module which applies a timeout to upshift demands when there is too fast a lift-off of the accelerator pedal, so as to forward to the next module 12 a signal corresponding either to the recommended and corrected gear ratio or to the gear ratio engaged.

This anticipation module 12 checks the space of time between two successive gear-change demands in order to suspend a gear-change demand that comes too soon after the preceding one and application of which could prove dangerous.

The recommended gear ratio thus determined for optimum fuel consumption and then possibly corrected as a function of the driving situation is applied to a unit 13 which converts the corresponding signal between an upshift or downshift demand and then formats it into an item of information that can be used, for example, to provide a visual display on the dashboard.

Thus, the strategy defined by the flow diagram of FIG. 3 makes it possible to recommend a gear-change demand that is always appropriate to the profile of the route and that makes it possible to optimize fuel consumption and reduce pollutant emissions while at the same time ensuring driving safety and drivability.

However, other functions could be performed, the invention not being restricted to the details of the embodiment which has just been described by way of a simple example.

Indeed, the modular design of this driving aid device means that a correction function can easily be removed or a new one added.

In general, the use of correction modules arranged in series and each applying a correction that takes priority over the preceding one, once the relevance thereof has been checked, makes it possible to simplify the software of the computer which can be more compact.

The invention claimed is:

1. A device to assist with control of a propulsion unit of a vehicle including a drive engine, a clutch, and a manual, mechanical, or semi-automatic gearbox, the device comprising:
   an indication unit configured to indicate to a driver a recommended transmission ratio, controlled by a control system including a computer into which there is incorporated at least one map of gear-change laws for determining a recommended gear ratio as a function of information concerning the driver's wishes, giving due consideration to a set of signals applied to inputs of the computer and that are representative of driving conditions of the vehicle at each instant,
   wherein the computer includes an element that determines the recommended gear ratio for optimum fuel consumption, as a function of information concerning the wishes of the driver and with due consideration given to speed of the vehicle and a plurality of separate calculation modules independent of one another and each assigned to a determined driving constraint, the modules being arranged in series so that if need be each can apply to a value of the recommended gear ratio a correction suited to the constraint considered and in an order that favors driving safety, each correction applied, as appropriate, by a module of the modules, taking priority over the correction applied by the preceding module.

2. The device as claimed in claim 1, wherein the computer further includes a unit for selecting a gear-change law as a function of information representative, at each instant, of a profile of a route and of a condition of the propulsion unit and a law management module determining a recommended gear ratio as a function of the selected gear-change law and of information concerning the wishes of the driver, with due consideration, at each instant, to the speed and, as appropriate, to an action applied to the brakes.

3. The device as claimed in claim 1, wherein the computer further includes a plurality of independent correction modules, arranged in series and each assigned to a driving constraint, each module including an input for a signal corresponding to a value of a gear ratio recommended in a preceding step, an input for one or more signals representative of parameters to be considered when activating the module if appropriate, a direct output for forwarding to the next step, without activation of the module, the value of the gear ratio recommended in the preceding step, and an output for forwarding to the next step, following activation of the module, the gear ratio that has been corrected as a function of the constraint considered.

4. The device as claimed in claim 3, wherein the series of correction modules include, in succession, starting from the determining of the gear ratio of optimum fuel consumption, at least:
   an anti-hunting module in order at each instant to maintain a sufficient reserve of power,
   a fixing module for maintaining the gear ratio engaged for as long as safety conditions are not met and in an event that it is detected that the vehicle has started to corner,
   an anticipation and anti-linking module to suspend a gear-change demand that comes too soon after a preceding gear-change demand, or to time out any gear-change demand made by the driver and which is contrary to the recommendation.

5. The device as claimed in claim 4, wherein the module that determines the recommended gear ratio for optimum fuel consumption is immediately followed by an inhibition module that is activated by a measurement of a rate at which the accelerator pedal is depressed and which, if it is depressed slowly below a given rate, maintains the value of the gear ratio engaged which is then subjected to any successive corrections that might be needed in order finally to determine the recommended gear ratio to be indicated to the driver.

6. The device as claimed in claim 1, in which the information concerning the wishes of the driver is represented by a degree to which the accelerator pedal is depressed, including means of measuring a rate at which the pedal is depressed and springs back and a module for applying a timeout to upshift gear-change demands if the pedal lifts rapidly at a rate higher than a given threshold.

7. A method to assist with control of a propulsion unit of a vehicle including a drive engine, a clutch, a manual gearbox, and a control system with a computer, the method comprising:
- controlling, with the computer, an indication to a driver of a gear ratio that is recommended as a function of information concerning wishes of the driver and with due consideration to a set of parameters relating to vehicle driving conditions at each instant and to a map of gear-change laws on the basis of which there is determined, as a function of speed of the vehicle at each instant, the gear ratio to be recommended for optimum fuel consumption and minimum pollutant emissions; and
- correcting the recommended gear ratio in successive steps giving due consideration, one after the other, to a set of constraints relating to safety and drivability, each step taking priority over the preceding step, so that the gear ratio finally recommended is an optimum compromise between these various constraints, favoring driving safety.

8. The method as claimed in claim 7, wherein the computer includes a plurality of separate calculation modules respectively assigned to each of constraints to be taken into consideration, and in that, in each correction step, the corresponding module checks a relevance of a value of the gear ratio recommended in the preceding step to a constraint with which the module is concerned, and depending on a result of a check, determines either to move directly on to the next step, maintaining the gear ratio recommended in the preceding step, or to modify the recommended gear ratio either upward or downward.

9. The method as claimed in claim 7, in which the information concerning the wishes of the driver is represented by a degree to which the accelerator pedal is depressed, wherein a rate at which the pedal is depressed is measured and slow depressing, below a given rate, inhibits any demand to downshift without preventing an upshift in the event that the speed of the vehicle increases.

10. The method as claimed in claim 7, wherein any unsafe demand to change gear is inhibited, the recommendation then being fixed.

* * * * *